April 26, 1927.

S. W. SHAW 1,625,829

GARDEN CULTIVATOR

Filed Sept. 5, 1925

INVENTOR
S. W. SHAW
BY Munn & Co.
ATTORNEYS

April 26, 1927.
S. W. SHAW
1,625,829
GARDEN CULTIVATOR
Filed Sept. 5, 1925   2 Sheets-Sheet 2
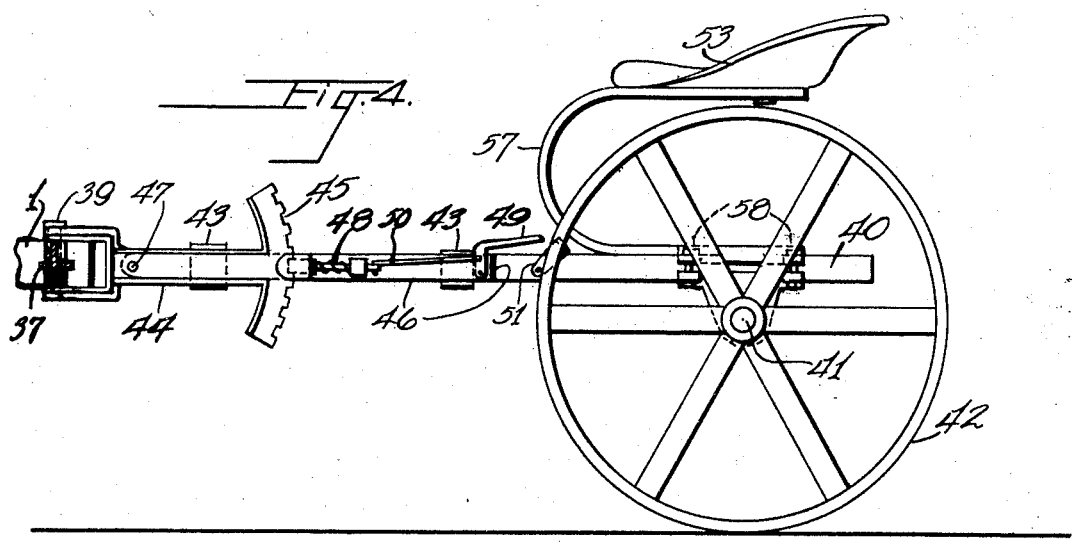
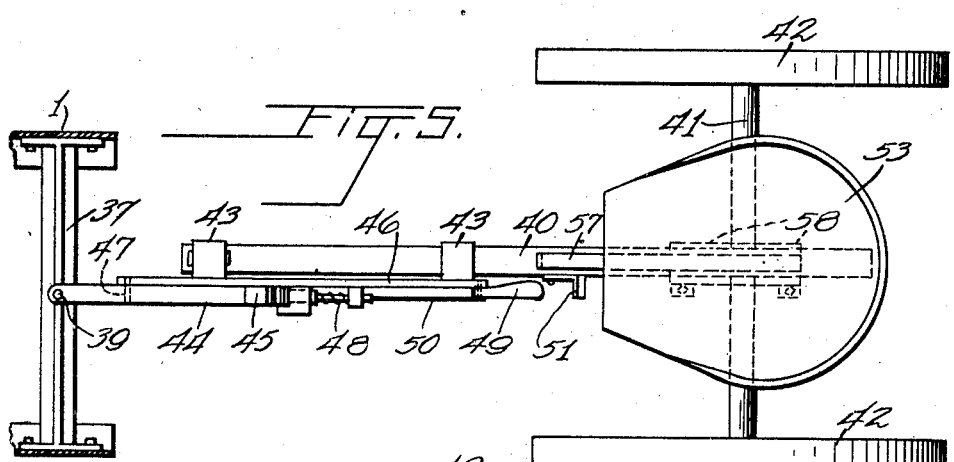
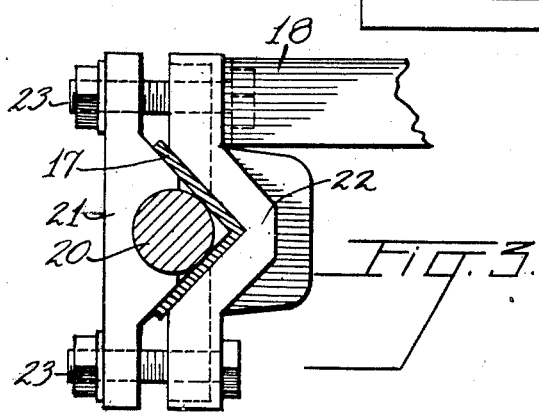
INVENTOR
S. W. SHAW
BY Munn Teo.
ATTORNEYS Patented Apr. 26, 1927.

1,625,829

UNITED STATES PATENT OFFICE.

STANLEY W. SHAW, OF GALESBURG, KANSAS.

GARDEN CULTIVATOR.

Application filed September 5, 1925. Serial No. 54,748.

My invention relates to improvements in garden cultivators, and it consists in the combinations, constructions and arrangements herein described and claimed.

An object of my invention is to provide a garden cultivator which makes use of novel means for moving the ground-digging tools with respect to the cultivator, this means being controlled by the hands and feet of the operator.

A further object is to provide a device of the type described, in which the tools are disposed in two sets, one set being controlled by the left hand of the operator, while the other set is controlled by the right hand of the operator.

The device is further provided with novel means for connecting the two sets of tools together to permit the tools to operate simultaneously.

A further object is to provide a device of the type described, which makes use of a trailer for carrying the operator, this trailer being removably secured to the cultivator by means of a single bolt, and being so secured to the cultivator that the digging tools of the cultivator may be raised or lowered with respect to the ground, so as to vary the depth at which the tools dig.

Other objects and advantages will appear in the following specification, and the novel features of the invention will be particularly pointed out in the appended claims.

My invention is illustrated in the accompanying drawings, forming part of this application, in which—

Figure 3 is a section along the line 3—3 of Figure 2,

Figure 4 is a side elevation of the trailer as shown operatively applied to the device, and Figure 5 is a plan view of Figure 4.

Figure 1:
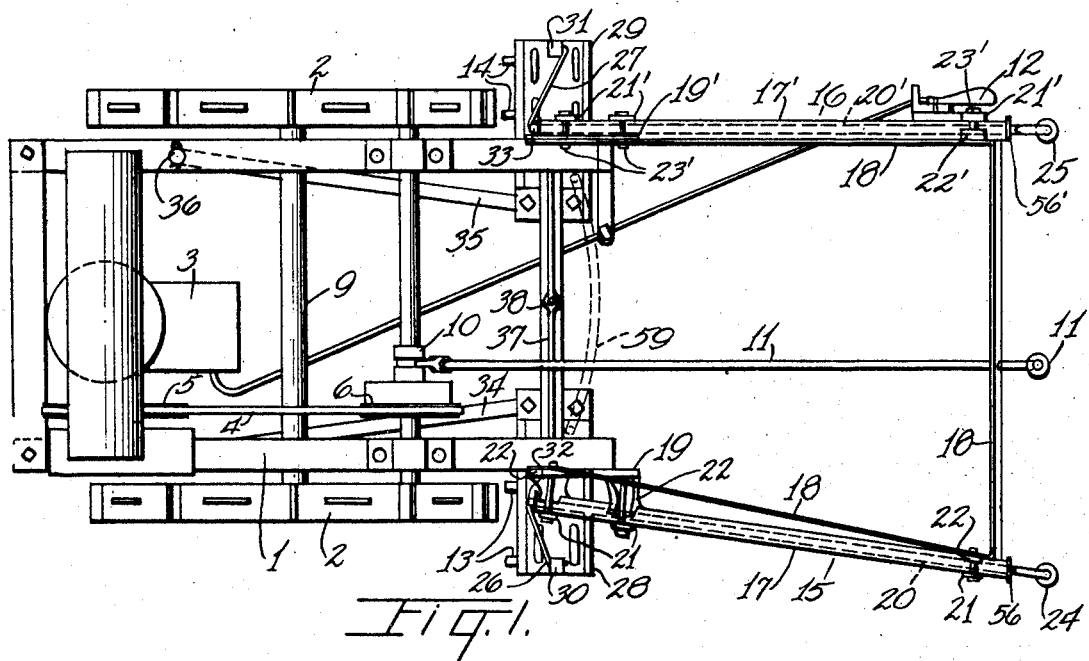
Figure 1 is a plan view of the device.

In carrying out my invention, I provide a frame 1 that is supported by wheels 2. The frame carries an engine 3, and this engine is connected to the wheels 2 by means of a chain 4, sprockets 5 and 6, and gears 7 and 8. The gears 8 are connected to the wheels 2 by means of differential ratchets (not shown). This permits easy turning.

In Figure 1, I have shown a clutch 10 for throwing the engine 3 into and out of operative engagement with the wheels 2. This clutch is moved by means of a handle 11 that extends to a position adjacent to the operator. Figure 1 also shows a throttle lever 12 for controlling the speed of the engine 3. This lever is disposed adjacent to the operator to permit the operator to control the speed of the engine, while at the same time steering the device.

I will now describe the special construction by means of which I can move the ground-digging tools, 13 and 14 with respect to the cultivator. This means is clearly shown in Figures 1, 2 and 3. The cultivator is provided with upwardly inclined handles 15 and 16. Each of these handles consists of an angle iron 17 and a supporting brace 18. The angle iron 17 and the supporting brace 18 are secured to a bracket 19. Rotatably mounted in the angle iron 17 is a rod 20. Figure 3 clearly shows how the rod 20 is held in place in the angle iron, and at the same time is permitted to be rocked for the purpose hereinafter described.

Figure 2:
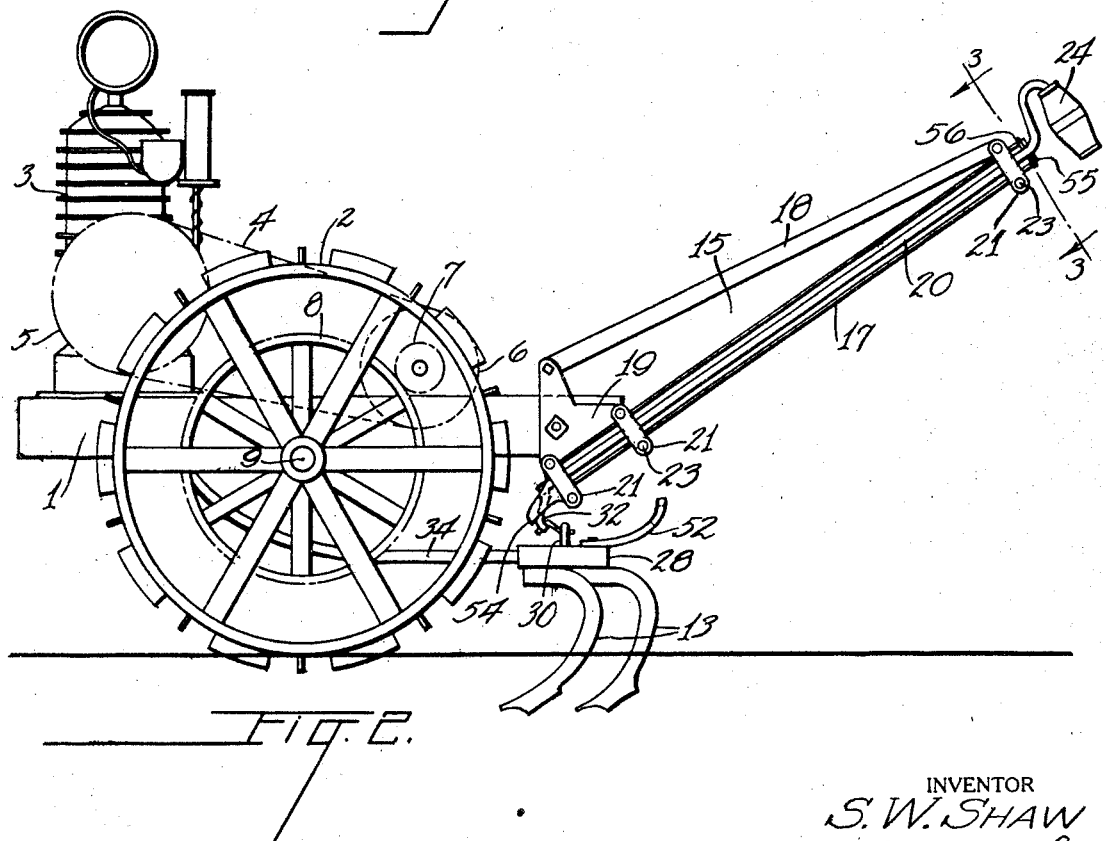
Figure 2 is a side elevation of the device.

The means for securing the rod 20 in the angle iron consists of caps 21 which, in turn, are secured to brackets 22 by means of bolts 23. In Figure 2, I have shown three of these caps 21 as being secured to the angle iron 17. The upwardly inclined handles 15 and 16 are constructed identical to each other, except that the handle 15 extends at an angle with respect to the handle 16, as clearly shown in Figure 1. The purpose of this is to dispose the handle 24 a sufficient distance to the left of the machine to permit the operator to walk along the left hand side of the row while the machine straddles the row. The rods 20 of the frames 15 and 16 are curved, as shown in Figure 2, and are provided with handles 24 and 25. The operator grasps these handles in guiding the machine down the row, and also turns these handles to move the tools 13 and 14 laterally with respect to the machine.

The tools 13 and 14 are connected to the rods 20 and 20' by means of links 26 and 27. The tools are removably secured to plates 28 and 29, and the plates, in turn, are provided with upwardly extending projections 30 and 31, to which the links 26 and 27 are connected. The connection between the links 26 and 27 and the rods 20 and 20' is accomplished by means of arms 32 and 33 that are bent laterally from the rods 20 and 20'. It will be noted from this construction that when the handles 24 and 25 are swung, they will move the tools 13 and 14 laterally with respect to the machine. In this way, I provide novel means for causing the tools to hug the rows of vegetables being cultivated. As heretofore stated, while the handles 24 and 25 are primarily designed to move the tools 13 and 14 laterally with respect to the machine, these handles are also used to guide the machine much in the same manner as the handles of a wheel barrow.

The plates 28 and 29 are carried by pivoted arms 34 and 35. Figure 1 shows the arms as being pivotally secured to the frame 1 at 36. It should be noted that at this point one of the connecting braces 37 of the frame 1 is provided with an opening 38, through which a bolt 39 is adapted to be disposed for connecting a trailer to the machine.

The trailer is clearly shown in Figures 4 and 5, and consists of a tubular member 40 that is mounted upon a shaft 41, the shaft, in turn, being carried by the wheels 42. The member 40 is removably disposed in sleeves 43, and the sleeves loosely receive the member 40 to permit the member to be swung in a vertical plane for a purpose hereinafter described. The bar 44 that is pivotally secured to the braces 37 is provided with an arcuate-shaped rack. To the bar 44 I pivotally secure a bar 46 at 47. The bar 46 carries the sleeves 43 and also carries a spring pressed locking dog 48. The dog 48 is controlled by means of a lever 49 and a link 50. When the lever 49 is in the position shown in Figure 4, the rack 45 is rigidly secured to the member 40. If the operator wishes to adjust the tools 13 and 14 with respect to the ground, he merely depresses the lever 49, and then moves the handles 24 and 25 upwardly or downwardly, so as to swing the whole frame 1, which, in turn, will swing the rack 45 with respect to the bar 46. This movement raises or lowers the tools 13 and 14. When the desired position is obtained, the operator releases the lever 49, and the dog will now lock the rack 45 to the bar 46.

In case the operator wishes to move the tools 13 and 14 as the cultivator moves along the row, he depresses the lever 49 and locks the lever in the depressed position by means of a clevis 51. The operator can now raise and lower the tools 13 and 14 by moving the handles 24 and 25 in an upward and downward direction. If the operator wishes to have his hands free for other purposes, I provide stirrups 52 for the feet of the operator. The stirrups permit the operator to move the tools 13 and 14 independently of the handles 24 and 25. A seat 53 is provided for the operator.

From the foregoing description of the various parts of the device, the operation thereof may be readily understood. The machine is designed to be used with or without a trailer. Figures 1 and 2 show the machine without the trailer. In this case, the operator walks behind the machine and guides and controls the same by means of the handles 24 and 25 and the lever 12. The operator, in guiding the machine, may also swing the handles 24 and 25 so as to shift the tools 13 and 14 with respect to the machine. The depth at which the tools dig is controlled by moving the handles 24 and 25 vertically. A stop member 54 is provided for each of the frames 15 and 16 for limiting the movement of the rods 20 and 20'. The rods 20 and 20' are provided with cotter pins 55 for taking up end thrust. These pins bear against washers 56, the washers, in turn, bearing against the upper ends of the angle irons 17 and 17'. The lever 12 is disposed near enough to the handle 25 to permit the operator to control the speed of the cultivator while still gripping the handle 25.

When the trailer is used, the stirrups 52 may also be used. The function of the stirrups has already been set forth. The trailer is provided with means for keeping the tools 13 and 14 at the proper depth, and this means may be locked in adjusted position at the will of the operator. This means consists of the rack 45 and the locking dog 48 as hereinbefore set forth. The seat 53 is also adjustable, and in Figure 5 I show the seat supporting member 57 as being provided with a clamp 58 for this purpose. The clamp secures the seat to the tubular member 40. The wheels 42 are also adjustably secured to the member 40, and may be moved with respect to the member 40 to provide a perfect balance between the trailer and the machine proper.

When the operator wishes to connect the tools 13 and 14 together, he makes use of an arch 59 (see Figure 1). This arch rigidly connects the plates 28 and 29 together, and causes the tools 13 and 14 to be moved at the same time, whether the handle 24 is actuated or the handle 25.

I claim:

A device of the type described comprising a two-wheeled motor-propelled frame, beams laterally swingeable relative thereto, axially rotatable guiding handles mounted on the frame and extending upwardly and rearwardly, and a connection between each handle and a beam for lateral movement of said beam upon rotation of the respective handle.

STANLEY W. SHAW.